United States Patent [19]

Beales et al.

[11] Patent Number: 4,566,754
[45] Date of Patent: Jan. 28, 1986

[54] OPTICAL FIBRES

[75] Inventors: Keith J. Beales, Ipswich; Clive R. Day, Suffolk; Benjamin J. Ainslie; James D. Rush, both of Ipswich, all of United Kingdom

[73] Assignee: British Telecommunications, London, England

[21] Appl. No.: 361,093

[22] Filed: Mar. 23, 1982

[30] Foreign Application Priority Data

Apr. 8, 1981 [GB] United Kingdom ............... 8111013

[51] Int. Cl.⁴ .................................. G02B 5/172
[52] U.S. Cl. ........................ 350/96.30; 65/3.11; 65/3.12; 65/18.2; 65/DIG. 16
[58] Field of Search ............ 65/3.12, 18.2, 3.11; 264/1.5; 350/96.30, 96.34

[56] References Cited

U.S. PATENT DOCUMENTS

Re. 28,028  6/1974  Maurer ................. 65/3.12
4,045,198  8/1977  Rau et al. ............ 65/3.12 X
4,339,174  7/1982  Levin ................. 65/3.12 X
4,385,802  5/1983  Blaszyk et al. ....... 65/3.12 X Primary Examiner—Arthur Kellogg
Attorney, Agent, or Firm—Kemon & Estabrook

[57] ABSTRACT

An optical fibre capable of monomode transmission in, and having a wavelength of zero dispersion in, the 1.55 μm window and having a core comprising silica and germanium dioxide and a cladding comprising silica is drawn from an appropriate preform at a temperature in the range from 1900° C. to 2000° C. Fibres thus produced have low loss compared with fibres drawn at higher temperature.

19 Claims, 3 Drawing Figures

OPTICAL FIBRES

This invention relates to monomode optical fibres, i.e. fibres capable of transmitting light by propagation as a single mode. Monomode fibres which comprise a silica-based core and cladding are physically characterized by their small dimensions and have typically a core diameter from 4 to 10 μm and a cladding diameter of at least 20 μm, preferably from 20 to 50 μm. The cladding is usually further surrounded.

In order to function there must be a difference between the refractive index of the core and that of the cladding and this difference will hereinafter be referred to, as is conventional, as Δn. The refractive index of the core is normally greater than the refractive index of the cladding. This may be achieved, in a silica-based fibre, by the use of a core containing silica and germanium dioxide (the latter component serving to raise the refractive index above that of pure silica) and of a cladding having a refractive index which is similar to that of pure silica.

Monomode optical fibres find application in telecommunications, e.g. the transmission of telephone messages. Their advantages over multimode optical fibres are now being appreciated. Single mode fibres can exhibit lower signal loss levels and may be used with higher data transmission rates than multimode fibres.

The prior art and background to the present invention will now be described with reference to the first two of the accompanying drawings of which:

These Figures and the corresponding discussion hereinafter are intended to facilitate understanding of the present invention, but relate directly to the performance of present invention only in such manner as will be apparent.

Figure 1:
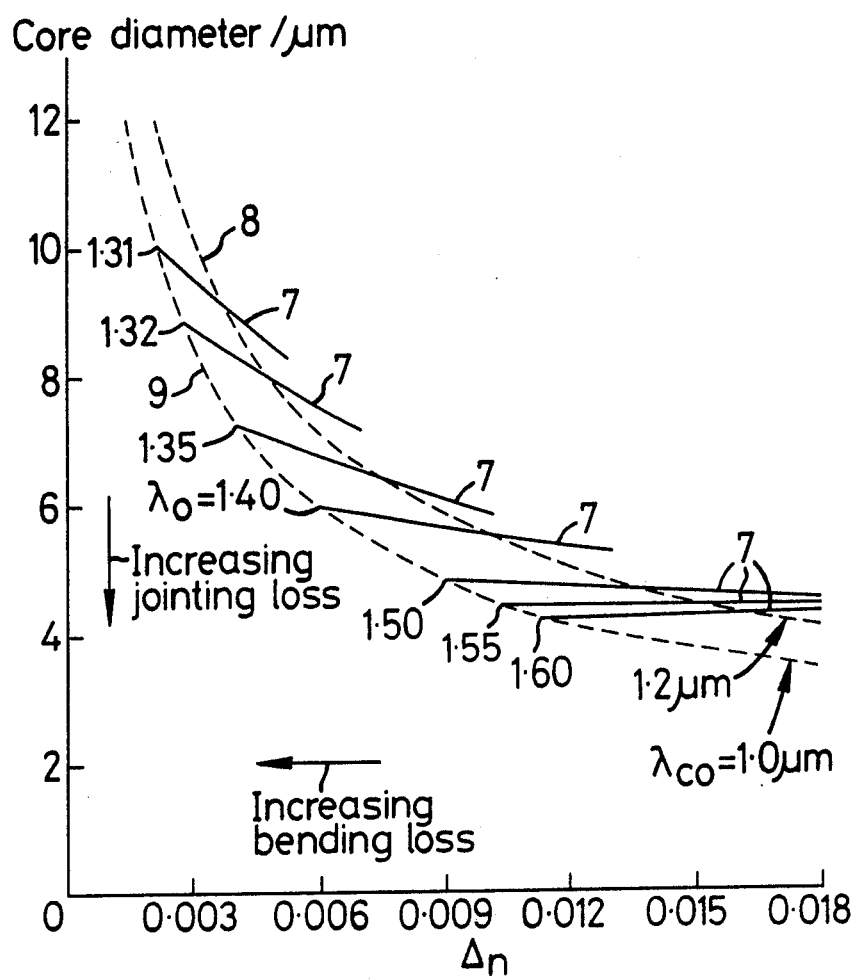
FIG. 1 shows the theoretical relationships between fibre core diameter, Δn, fibre dispersion zero, fibre cut-off wavelength, jointing losses and bending losses in a particular class of monomode fibres.

The factors affecting fibre performance are indicated in FIG. 1 for monomode fibres having a core comprising silica and germanium dioxide and a cladding having a refractive index close to that of pure silica. Among the detailed comments that can be made are:

(a) The lower the Δn value of a particular fibre the greater its susceptibility to micro-bending loss becomes; therefore, fibres having low Δn values, in the order of 0.003, can suffer from a great deal of signal loss if they are allowed to bend.

(b) The smaller the core diameter of a fibre becomes, the more difficult it becomes to join it effectively and the average signal loss per joint in a fibre rises with a reduction in its core diameter.

(c) Curves 8 and 9 on FIG. 1 run through values of core diameter and Δn for fibres which have second order mode cut off wavelengths, hereinafter referred to as $\alpha_{co}$ wavelengths, of 1.2 μm and 1.0 μm respectively. It is undesirable for $\lambda_{co}$ to be very close to or at a fibre operating wavelength because there is total signal loss of the second order mode from a fibre at its $\lambda_{co}$ and a considerable signal loss close to its $\lambda_{co}$. Fibres having a $\lambda_{co}$ of approximately 1.2 μm or less have the advantage that they transmit by monomode propagation any wavelengths in excess of about 1.3 μm. However, if use only at somewhat higher wavelengths is desired, then a rather higher $\lambda_{co}$ will be permissible, corresponding to a curve rather further out from the origin than curve 8. There is little advantage unless shorter wavelengths than approximately 1.3 μm are to be used in fibres having $\lambda_{co}$ of less than 1.0 μm, in view of the increased microbending and jointing losses towards the origin of FIG. 1.

(d) Dispersion in a monomode optical fibre is the spreading out of a pulse propagated down the fibre thus limiting the number of discrete pulses which may be sent along a fibre, per given time period, without consecutive pulses becoming confused. The cause of dispersion in such a fibre is that signals of different wavelengths propagating along the fibre travel at different velocities. This problem can be significant even when a light source having a narrow output waveband is employed. Therefore in order to maximise the rate at which data may be sent along a fibre at a particular transmission wavelength the dispersion at that wavelength should be minimised, other things being equal. By balancing the dispersion caused by the refractive index profile of the fibre with that caused by the materials from which the fibre is constructed it is possible to make a fibre having zero dispersion at, or about, a particular chosen wavelength. This wavelength is called the dispersion zero wavelength of a fibre and hereinafter will be referred to, as is conventional, as $\lambda_o$. Ideally $\lambda_o$ in a fibre should coincide with the operating wavelength of any communications system employing the fibre if large bandwidths are required. The dependence of $\lambda_o$ on Δn and core diameter is illustrated in FIG. 1 where curves 7 run through values of core diameter and Δn which give the same $\lambda_o$.

For the class of fibres shown in FIG. 1, it follows that the values of Δn and the core diameter of the fibre should preferably lie in the region between curves 8 and 9 on FIG. 1 at a point on the line of the desired refractive index. While the detailed values, etc., in FIG. 1 are not universally applicable, being based on various assumptions, an important general conclusion for present purposes is that practically useful fibres having high $\lambda_o$ (e.g. of approximately 1.55 μm) normally have higher Δn and smaller core diameters than fibres having a relatively low $\lambda_o$ (e.g. of approximately 1.3 μm).

Figure 2:
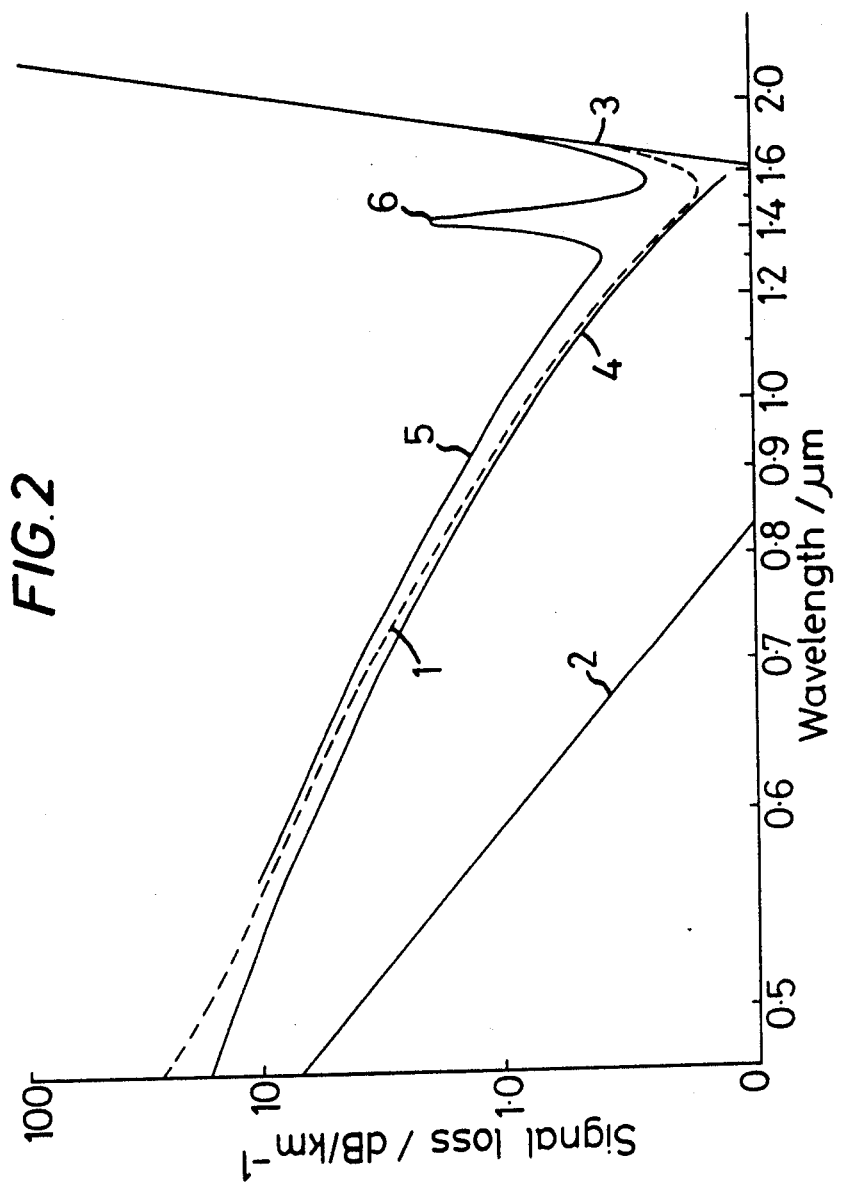
FIG. 2 shows the theoretical intrinsic loss in a particular monomode optical fibre.

The significance of the figures 1.3 μm and 1.55 μm just mentioned is apparent from FIG. 2. This displays the various factors affecting theoretical intrinsic loss as a function of wavelength for a monomode fibre having a core comprising silica and germanium dioxide and a cladding having a refractive index approximately equal to that of silica. Curve 2 is the "tail" of a uv absorption band; curve 3 is part of an infrared absorption band; curve 4 represents Rayleigh scattering. The sum of curves 2 to 4, represented by curve 1, has a single minimum at rather more than 1.5 μm. However, small quantities of water incorporated in the fibre during production normally result in a substantial absorption band centred at approximately 1.4 μm. In principle, therefore, fibres of this type should have an intrinsic loss spectrum qualitatively similar to curve 5, with two regions of low loss centred at approximately 1.3 μm and 1.55 μm respectively. These regions are termed "windows". Both the 1.3 μm window and the 1.55 μm window have been considered for the carrier signal in optical telecommunications.

While the detailed values in FIG. 2 are not universally applicable, being based on various assumptions (including a core germanium dioxide concentration), an important general conclusion for present purposes is that, in principle (see curve 5), the 1.55 μm window is the better one, with a lower minimum loss; if loss similar to that indicated by the theoretical curve 5 could be realised in practice, then the window would, from the loss point of view, be an attractive one up to about 1.7 μm and as far towards 1.4 μm as the water content permitted. The 1.55 μm window is also effectively larger than the 1.3 μm window in spectral width for a given acceptable loss (which may be important if there are constraints on source wavelength or if wavelength multiplexing is to be used). Moreover, the 1.3 μm window is, on balance, the more vulnerable to water-related absorption. If the water content of a fibre is allowed to increase, as may happen in practice, the water absorption peak 6 on curve 5 would not only become taller, or more intense, but it would also become wider. The initially narrower window at about 1.3 μm would be encroached upon and transmission losses in a system using this window would be increased more than those in a system using the window centred at about 1.55 μm.

It can be seen from the above that there exist in principle potential advantages in a communications system which operates at a wavelength of about 1.55 μm.

However, producing fibres highly suited for optical communication in the 1.55 μm window has proved difficult in practice.

T. Miya, Y. Terunuma, T. Hosaka, and T. Miyashita (Electronics Letters, volume 15, pages 106–108 (1979)) produced a monomode fibre with a silica/germanium dioxide core (diameter 9.4 μm), a pure silica cladding, and Δn=0.0028. (We believe that this fibre core must have contained approximately 2 mole percent of germanium dioxide.) The fibre had loss minima of approximately 0.6 and 0.2 dB/km at approximately 1.3 μm and 1.55 μm respectively. However, on account of the large core diameter and low Δn, $\lambda_o$ was 1.27 μm and dispersion at 1.55 μm was significant (17 ps/nm km); the disadvantages of this will be apparent from the previous discussion.

A. Kawana, T. Miya, N. Imoto, and H. Tschuchiya (Electronics Letters, volume 16, 188–189 (1980)) produced four monomode fibres having cores comprising silica and germanium dioxide. The core diameters ranged from 4.1 to 4.8 μm and the Δn from about 0.0074 to 0.0084. On account of this relatively narrow core and relatively high Δn, $\lambda_o$ ranged from 1.46 to 1.50 μm. However, the losses measured at 1.52 μm were high (0.8 to 1.14 dB/km), compared with that for the wider-core lower-Δn fibre described in Electronics Letters 1979 and compared with the theoretical intrinsic loss.

T. Miya, A. Kawana, Y. Terunuma, and T. Hosaka (Transactions of the Institution of Electronic and Communications Engineers of Japan, volume E63, pages 514 to 519 (1980)) also describe two narrow-core high-Δn fibres having $\lambda_o$=1.47 and 1.53 μm respectively, but the minimum loss in the 1.55 μm window was 0.5 dB/km, which is high compared with the loss in this window for wider-core lower-Δn fibres described in Electronics Letters 1979 and compared with the theoretical intrinsic loss.

Hitherto, therefore, a shift of the dispersion zero wavelength $\lambda_o$ into the 1.55 μm window has been at the expense of increasing the minimum loss in that window.

The fibres described in the above mentioned three prior art documents were produced by drawing an appropriate preform, but the drawing conditions are not precisely specified (in particular, the drawing temperature is not specified).

To our knowledge, no monomode fibres having a core comprising silica and germanium dioxide have previously been drawn at a temperature of 2000° C. or less. Indeed, temperatures above 2000° C. (up to 2200° C.) would be expected to recommend themselves on account of the lower glass viscosity permitting high pulling speeds for a given drawing tension, so long of course as there were no compensating advantage of relatively low temperatures.

Relatively low-temperature drawing of *multimode* fibres (i.e. fibres having very wide cores compared with those referred to hereinbefore) has been described in the literature, but the results, even insofar as they may be considered relevant at all to the production of monomode fibres, do not suggest that any such compensating advantages exist in respect of monomode fibres having a core comprising silica and germanium dioxide and having a dispersion zero wavelength in the 1.55 μm window. Thus, D. H. Smithgall, M. A. Saifi, and M. J. Andrejco (Electronics Letters, volume 15, pages 56 to 57 (1979)) produced graded-index fibres having a germanium borosilicate core, an outer diameter of 110 μm, and a core/cladding ratio of 1:2, and concluded that transmission loss is independent of draw tension and temperature. They expressed the opinion that dependence of loss on such factors was typical of only phosphosilicate systems (such dependence having been previously reported by K. Yoshida, S. Sentsui, H. Shii, and T. Kuroha in Technical Digest of IOOC, Tokyo, Japan, 1977, pages 327–330). Drawing-dependent loss with a multimode fibre core containing silica, germanium dioxide, and phosphorus pentoxide has been observed also by W. Auer, K. Kimrich, I. Riegl, and U. Zwick (Proceedings of the European Fibre Optics Conference Paris, July 1980).

It should be noted that the presence of phosphorus in the core is undesirable for the production of monomode fibres for use at 1.55 μm because of the extra loss which the presence of this element is expected to cause at this wavelength, especially in view of the likely water content of the fibre. It is known that the first overtone of the P-OH vibration at 3.05 μm causes absorption centred at about 1.6 μm.

The present invention is based on our surprising discovery that by drawing from preforms at a temperature of approximately 1950° C. one may reduce the loss which has hitherto arisen in the production of monomode fibres having zero dispersion in the 1.55 μm window, the loss in question apparently including a substantial non-intrinsic component associated with high germanium dioxide concentrations in the core.

The present invention provides a method of producing an optical fibre capable of monomode transmission in, and having a wavelength of zero dispersion in, the 1.55 μm window and having a core comprising silica and germanium dioxide and a cladding comprising silica, said method comprising drawing an appropriate preform, characterised in that the drawing is performed at a temperature in the range from 1900° C. to 2000° C.

The preform is conveniently prepared by the MCVD (modified chemical vapour deposition) process. In this, layers of cladding and then of core material are deposited from an appropriate vapour mixture onto the inside of a silica tube which is then collapsed to yield the preform, which may be sleeved with another silica tube before drawing, so as to achieve a particular desired aspect ratio. The vapour mixtures that may be used as appropriate are mixtures of pure oxygen with one or more of $SiCl_4$, $GeCl_4$, $POCl_3$, and $CCl_2F_2$ (these latter compounds providing Si, Ge, P and F respectively). Advantageously, chlorine is present as a drying agent during collapsing of the tube.

Among other methods which may be used for producing the preform are outside vapour phase oxidation, vapour axial deposition, and plasma modified chemical vapour deposition.

Conveniently, the cladding has a refractive index close to that of pure silica (preferably slightly lower rather than slightly higher). For this, the cladding may consist entirely of pure silica or it may include dopants such as phosphorus and fluorine in such amounts that their respective effects on refractive index (namely raising and lowering) substantially cancel. The latter expedient permits the use of lower deposition temperatures in MCVD. Preferred compositions have of the order of 1 mole percent of $P_2O_5$. However, it is desirable to reduce the P and F concentrations immediately adjacent to the core, so as substantially to avoid absorption due to phosphorus (hereinbefore mentioned in a different context).

Alternatively, the cladding may have a refractive index lower than that of silica by a substantial amount (by 0.001 or more). This can be achieved by the use of a refractive-index-depressing dopant, e.g. fluorine, not fully compensated for by refractive-index-raising dopants, e.g. phosphorus.

The overall cladding diameter is preferably at least 20 $\mu$m and conveniently from 20 to 50 $\mu$m.

Values of $\Delta n$ and of core diameter that may be used for fibres according to the present invention may readily be found by trial and error by the man skilled in the art, but it may be noted that a $\Delta n$ of from 0.0075 to 0.0175, especially from 0.009 to 0.016, most especially of approximately 0.012, and of core diameters from 4 to 5.5 $\mu$m, especially from 4 to 5 $\mu$m, will in general be advantageous for a $\lambda_o$ in the 1.55 $\mu$m window. The concentrations of germanium dioxide in the core will in general be from 5 to 12.5 mole percent, especially from 6 to 11.5 mole percent, most especially approximately 10 mole percent.

Preferably, fibres produced in accordance with the present invention should be pulled at speeds of at least 20 meter/min because of the greater loss reduction which results. We have found pulling speeds from 20 to 60 meter/min convenient.

Strength tests on fibres produced in accordance with the present invention have yielded Weibull plots in which the low strength tail is similar to that for fibres pulled at temperatures of 2050° C. and 2150° C.

Figure 3:
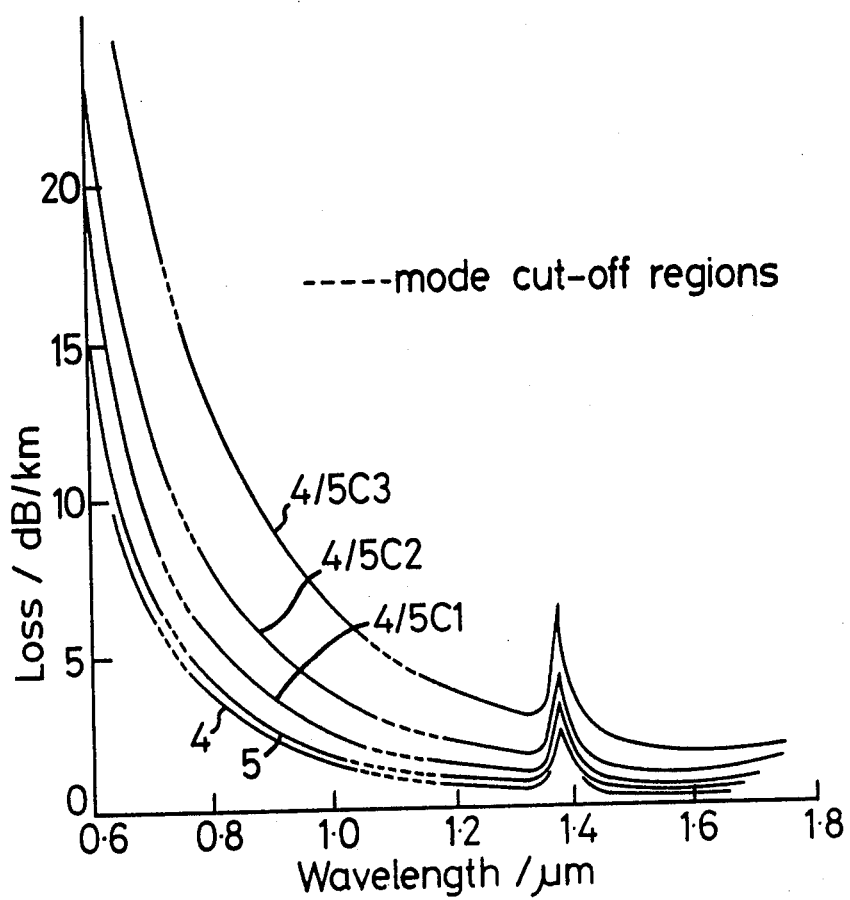
FIG. 3 shows the intrinsic loss as a function of wavelength for the fibres of Examples 4 and 5 and Comparative Examples 4/5C2, and 4/5C3.

The method according to the present invention will now be illustrated by means of Examples and Comparative Examples and the accompanying FIG. 3 relating to some of these.

In all cases, the preforms were produced by modified chemical vapour deposition. This was used to apply sequentially layers of cladding and core material to the inside of a silica tube which was then collapsed in the presence of chlorine to produce a preform. The preforms were sleeved and then drawn in a carbon resistance furnace, the temperature of whose hot zone was measured by optical pyrometry.

The cladding, both "inner" and "outer" was silica doped with phosphorus and fluorine in such quantities as to match the refractive index closely to that of pure silica.

The fibres, immediately after drawing, were coated with silicone resin which was then cured at approximately 300° C.

Examples 1, 2, and 3 and Comparative Examples 1C1, 1C2, 2C1, 2C2, 3C1, and 3C2 relate to the production of a monomode fibre for which (all figures being approximate):

| | |
|---|---|
| Core diameter = | 4.5 $\mu$m |
| Cladding diameter = | 30 $\mu$m |
| Fibre outer diameter = | 100 $\mu$m |
| Core molar ratio $GeO_2:SiO_2$ = | 1:9 |
| $\Delta n$ = | 0.013 |
| $\lambda o$ = | 1.55 $\mu$m |
| $\lambda co$ = | 1.2 $\mu$m |

The same preform was used for these Examples and Comparative Examples, this having been produced by MCVD with a deposition tube of silica having an outer diameter of 20 mm and a wall thickness of 2 mm. The vapour mixtures used, and the number of burner passes, for the various layers, were as follows:

| Outer cladding | | | |
|---|---|---|---|
| $SiCl_4$ | 0.6 | l/min | ⎫ flow of $O_2$ through |
| $POCl_3$ | 0.16 | l/min. | ⎬ liquid at 18° C. |
| $CCl_2F_2$ | 0.0032 | l/min | ⎭ |
| $O_2$ | 1.0 | l/min | |
| Number of passes 30 | | | |
| Inner cladding (B) | | | |
| $SiCl_4$ | 0.6 | l/min | ⎫ flow of $O_2$ through |
| $POCl_3$ | 0.08 | l/min | ⎬ liquid at 18° C. |
| $CCl_2F_2$ | 0.0016 | l/min | ⎭ |
| $O_2$ | 1.0 | l/min | |
| Number of passes 2 | | | |
| Inner cladding (A) | | | |
| $SiCl_4$ | 0.6 | l/min | ⎫ flow of $O_2$ through |
| $POCl_3$ | 0.05 | l/min | ⎬ liquid at 18° C. |
| $CCl_2F_2$ | 0.0009 | l/min | ⎭ |
| $O_2$ | 1.0 | l/min | |
| Number of passes 2 | | | |
| Core | | | |
| $GeCl_4$ | 0.19 | l/min | ⎫ flow of $O_2$ through |
| | | | ⎬ liquid at 18° C. |
| $SiCl_4$ | 0.174 | l/min | ⎭ |
| $O_2$ | 1.0 | l/min | |
| Number of passes 2 | | | |

The burner traverse rate for core deposition was 0.7 of that for cladding deposition.

After collapse of the tube to yield the preform, the preform was sleeved in with a silica tube of 25 mm outer diameter and of 3 mm wall thickness.

EXAMPLE 1

The preform was drawn at a temperature of 1950° C. and at a speed of 45 meter/min.

The resulting fibre had loss at 1.55 $\mu$m of 0.37 dB/km. (For completeness, it is noted that the loss at 1.3 $\mu$m was 0.6 dB/km.)

COMPARATIVE EXAMPLES 1C1 AND 1C2

The preform was drawn at temperatures and drawing speeds of 2050° C. and 55 meter/min. (Example 1C1)

and 2150° C. and 55 meter/min. (Example 1C2). The losses at 1.55 μm were 0.55 dB/km and 0.75 dB/km respectively. Had precisely the same drawing speed been used as in Example 1, then these losses would have been somewhat higher still. (For completeness, it is noted that the losses at 1.3 μm were 0.75 and 1 dB/km respectively.)

EXAMPLE 2

The preform was drawn at a temperature of 1950° C. and a speed of 25 meter/min.

The loss of the fibre produced, at 1.55 μm, was 0.65 dB/km. (At 1.3 μm, the loss was 0.75 dB/km.)

COMPARATIVE EXAMPLES 2C1 AND 2C2

The preform was drawn at a temperature and a drawing speed of 2050° C. and 30 meter/min. (Comparative Example 2C1) and of 2150° C. and 30 meter/min. respectively.

The losses at 1.55 μm were 0.8 dB/km and 1.05 dB/km respectively. Had precisely the same drawing speeds been used as in Example 2, then the losses would have been somewhat higher still. (The losses at 1.3 μm were 1.05 and 1.5 dB/km respectively.)

EXAMPLE 3

The preform was drawn at a temperature of 1950° C. and at a speed of 12 meter/min.

The loss of the fibre at 1.55 μm was 0.6 dB/km. (The loss at 1.3 μm was 0.75 dB/km.)

COMPARATIVE EXAMPLES 3C1 AND 3C2

The preform was drawn at 2050° C. and 15 meter/min. (Example 3C1) and at 2150° C. and 9 meter/min. (Example 3C2). The losses at 1.55 μm of the fibres produced were, respectively, 1.1 dB/km and >3 dB/km. (The losses at 1.3 μm were 1.6 and >4 dB/km respectively.)

EXAMPLES 4 AND 5; COMPARATIVE EXAMPLES 4/5C1, 4/5C2, AND 4/5C3

The fibres of these Examples and Comparative Examples were drawn from the same sleeved preform as one another, although this was not the same preform as was used in the previous Examples and Comparative Examples. The fibres drawn had a P- and F-containing cladding of a refractive index similar to that of pure silica, a core diameter of approximately 4.5 μm, and a Δn of approximately 0.013, and a $\lambda_o$ of approximately 1.55 μm. The drawing rate was approximately 20 meter/min.

The drawing temperatures were as follows:

| Example 4 | 1940° C. |
|---|---|
| Example 5 | 1990° C. |
| Comparative Example 4/5C1 | 2042° C. |
| Comparative Example 4/5C2 | 2100° C. |
| Comparative Example 4/5C3 | 2150° C. |

The loss curves of the fibres as a function of wavelength are shown in the accompanying FIG. 3. The loss at 1.55 μm in the fibre of Example 4 was 0.37 dB/km, and in that of Example 5 it was 0.5 dB/km.

We claim:

1. In a method of producing an optical fibre having a core comprised of a silica-based glass having silica and germanium dioxide as the main constituents and a cladding comprised of a silica-based glass having silica as the main constituent, wherein the optical fibre is formed by drawing a preform at an elevated temperature, wherein the preform comprises a core portion and a cladding portion which correspond to the core and cladding of the formed optical fibre, and wherein the materials and dimensions of the core portion and cladding portion of the preform and the drawing ratio are such that the formed optical fibre is capable of monomode transmission in the 1.55 μm window and has a wavelength of zero dispersion in the 1.55 μm window, the improvement which comprises drawing the preform at a temperature in the range of from 1900° C. to 2000° C.

2. A method according to claim 1, wherein the cladding has a refractive index close to that of pure silica.

3. A method according to claim 2, wherein the cladding contains phosphorus and fluorine.

4. A method according to claim 3, wherein the part of the cladding immediately adjacent to the core has lower phosphorus and fluorine concentrations than the remainder of the cladding.

5. A method according to claim 2, wherein the cladding consists entirely of pure silica.

6. A method according to any of claims 2 to 4 and 1, wherein the concentration of germanium dioxide in the core is in the range from 6 to 11.5 mole percent.

7. A method according to claim 6, wherein the concentration of germanium dioxide is approximately 10 mole percent.

8. A method according to any of claims 2 to 4 and 1, wherein the difference in refractive index between the core and the cladding is in the range from 0.009 to 0.016.

9. A method according to claim 8, wherein the difference in refractive index between the core and the cladding is approximately 0.012.

10. A method according to claim 1, wherein the core diameter is in the range from 4 to 5 μm.

11. A method according to any of claims 2 to 4 and 1, wherein the drawing is performed at a speed of at least 20 meter/minute.

12. A method according to claim 11, wherein the speed is in the range from 20 meter/minute to 60 meter/minute.

13. A method according to claim 6, wherein the drawing is performed at a speed of at least 20 meter/minute.

14. A method according to claim 1, wherein the cladding diameter is at least 20 μm.

15. A method according to claim 14, wherein the cladding diameter is in the range from 20 to 50 μm.

16. A method according to claim 1, wherein the preform has been produced by modified chemical vapour deposition.

17. An optical fibre which has been produced by a method according to any of claims 2 to 4 and 1.

18. An optical fibre which has been produced by a method according to claim 6.

19. An optical fibre which has been produced by a method according to claim 11.

* * * * *